US008671088B2

United States Patent
Cox et al.

(10) Patent No.: US 8,671,088 B2
(45) Date of Patent: *Mar. 11, 2014

(54) SYSTEM AND METHOD FOR PROVIDING A NATURAL LANGUAGE INTERFACE TO A DATABASE

(71) Applicant: AT&T Intellectual Property II, L.P., Atlanta, GA (US)

(72) Inventors: Richard Vandervoort Cox, Baltimore, MD (US); Hossein Eslambolchi, Los Altos Hills, CA (US); Behzad Nadji, Los Gatos, CA (US); Mazin G. Rahim, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,582

(22) Filed: Apr. 1, 2013

(65) Prior Publication Data

US 2013/0218564 A1    Aug. 22, 2013

Related U.S. Application Data

(63) Continuation of application No. 13/074,419, filed on Mar. 29, 2011, now Pat. No. 8,412,693, which is a continuation of application No. 11/013,836, filed on Dec. 16, 2004, now Pat. No. 7,921,091.

(51) Int. Cl.
*G06F 7/00* (2006.01)
*G06F 17/30* (2006.01)

(52) U.S. Cl.
USPC ........... 707/705; 707/706; 707/708; 707/735; 707/758; 704/1; 704/9

(58) Field of Classification Search
USPC .............. 707/705, 706, 708, 735, 758, 999.1, 707/999.3; 704/1, 9
See application file for complete search history.

(56) References Cited

U.S. PATENT DOCUMENTS

| | | | |
|---|---|---|---|
| 5,933,822 A | 8/1999 | Braden-Harder et al. | |
| 6,269,361 B1 | 7/2001 | Davis et al. | |
| 6,304,864 B1 * | 10/2001 | Liddy et al. | 706/15 |
| 6,434,524 B1 | 8/2002 | Weber | |
| 6,499,013 B1 | 12/2002 | Weber | |
| 6,532,444 B1 | 3/2003 | Weber | |
| 6,553,347 B1 | 4/2003 | Tavor et al. | |
| 6,598,047 B1 | 7/2003 | Russell et al. | |
| 6,633,864 B1 | 10/2003 | Christensen et al. | |

(Continued)

OTHER PUBLICATIONS

Feldman, Susan, NLP Meets the Jabberwocky: Natural Language Processing in Information Retrieval, Online May 1999, Copyright © Information Today, Inc.

(Continued)

*Primary Examiner* — Hares Jami

(57) ABSTRACT

A system and method for providing a natural language interface to a database or the Internet. The method provides a response from a database to a natural language query. The method comprises receiving a user query, extracting key data from the user query, submitting the extracted key data to a data base search engine to retrieve a top n pages from the data base, processing of the top n pages through a natural language dialog engine and providing a response based on processing the top n pages.

20 Claims, 3 Drawing Sheets

(56) References Cited

U.S. PATENT DOCUMENTS

| | | |
|---|---|---|
| 6,658,093 B1 | 12/2003 | Langseth et al. |
| 6,665,640 B1 | 12/2003 | Bennett et al. |
| 6,691,111 B2 | 2/2004 | Lazaridis et al. |
| 6,708,162 B1 | 3/2004 | Morgan et al. |
| 6,725,425 B1 | 4/2004 | Rajan et al. |
| 6,765,997 B1 | 7/2004 | Zirngibl et al. |
| 6,792,086 B1 | 9/2004 | Saylor et al. |
| 6,798,867 B1 | 9/2004 | Zirngibl et al. |
| 6,802,042 B2 | 10/2004 | Rangan et al. |
| 6,819,339 B1 | 11/2004 | Dowling |
| 6,829,603 B1 * | 12/2004 | Wolf et al. ............... 707/999.5 |
| 7,107,536 B1 | 9/2006 | Dowling |
| 7,725,307 B2 | 5/2010 | Bennett |
| 7,844,594 B1 | 11/2010 | Holt et al. |
| 7,899,802 B2 | 3/2011 | Sailor et al. |
| 2001/0056412 A1 * | 12/2001 | Kutsuzawa et al. ........... 705/80 |
| 2002/0077815 A1 | 6/2002 | Zhang et al. |
| 2002/0147674 A1 * | 10/2002 | Gillman ..................... 705/37 |
| 2003/0028792 A1 | 2/2003 | Plow et al. |
| 2003/0065739 A1 | 4/2003 | Shnier |
| 2003/0187925 A1 * | 10/2003 | Inala et al. ................. 709/204 |
| 2004/0068477 A1 * | 4/2004 | Gilmour et al. .............. 707/1 |
| 2004/0073555 A1 | 4/2004 | Hevener |
| 2004/0199541 A1 | 10/2004 | Goldberg et al. |
| 2005/0033968 A1 | 2/2005 | Dupouy et al. |
| 2005/0114325 A1 | 5/2005 | Liu et al. |
| 2005/0154723 A1 | 7/2005 | Liang |
| 2006/0031214 A1 | 2/2006 | Solaro et al. |
| 2006/0100969 A1 | 5/2006 | Wang et al. |
| 2009/0307577 A1 | 12/2009 | Lee |

OTHER PUBLICATIONS

Chai, Joyce et al. "Natural Language Sales Assistant—A Web-based Dialog System for Online Sales,", IBM T. J. Watson Research Center, Hawthorne, NY.

Chai, Joyce et al. "Comparative Evaluation of a Natural Language Dialog Based System and a Menu Driven System for Information Access: a Case Study". International Conference on Multimedia Information Retrieval (RIAO 2000), Apr. 2000, Paris, France.

González-Bernal, J.A. et al. "Natural Language Dialog System for Information Retrieval". National Institute of Astrophysics, Optics and Electronics. Puebla, Mexico.

Carbonell, Jaime G. "Is There Natural Language after Data Bases?" Computer Science Department, Carnegie-Mellon University, Pittsburg, Pennsylvania.

* cited by examiner

SYSTEM AND METHOD FOR PROVIDING A NATURAL LANGUAGE INTERFACE TO A DATABASE

PRIORITY INFORMATION

The present application is a continuation of U.S. patent application Ser. No. 13/074,419, filed Mar. 29, 2011, which is a continuation of U.S. patent application Ser. No. 11/013,836, filed Dec. 16, 2004, now U.S. Pat. No. 7,921,091, filed Apr. 5, 2011, the content of which is included herewith in its entirety.

BACKGROUND OF THE INVENTION

1. Field of the Invention

The present invention relates to a system and method of providing a natural language interface to a database such as the Internet.

2. Introduction

Recently, a large number of web based search engines, such as Yahoo® and Google®, have become widely available making it easier to find information over the Internet. The operation of these search engines is shown in FIG. 1 wherein a user with a computing device 102, such as a desktop computer or wireless handheld computing device, has client software such as a web browser that receives text in an input field. The web browser is directed to the website of the search engine (such as Google) which is transmitted from a search engine server 106 to the computing device 102. The search engine receives the query text and uses a particular search algorithm to search billions of webpages within the World-Wide-Web (WWW) 104.

These search engines came to organize the billions of pages of information on the WWW in such a way as to make them accessible and useful for those who submit queries into the search engine input field. The key technical innovation in the search engines lies in the ability to index all words and phrases in the WWW and use an efficient information retrieval algorithm along with many computers to be able to instantly find information per the user's request.

Finding information about a subject is as simple as typing keywords into an input field. This is illustrated in FIG. 2. For example, if the user desired to learn information about hurricanes, the user can simply type in the phrase "hurricane" into the search engine input field (202). The query is submitted to a search engine (204) which returns an ordered list of webpages according to the particular search engine algorithm (206). Although searching and mining the web has never been any easier, there still remains a manual process for users need to examine the top five or ten pages from the search to identify the answer to their query. Therefore, if one is looking to find out what the wind speed is of hurricane Ivan, then typing this question into the Google input field for example could provide an article that states "Hurricane Ivan is gaining speed and power". While this is clearly relevant to the question, and contains the correct key words, it does not answer the query correctly. Although it is natural for humans to think in terms of asking questions, and not merely keywords, and key phrases, humans have certainly become accustomed to operating differently when dealing with standard search engines.

Users typically Type keywords such as Hurricane-speed and then manually search through the relevant documents for the answer to the original question. Finding the answer typically requires the user to search manually through each page and look for the appropriate answer. When an answer cannot be found, users would normally provide alternative words in the hope of getting a different ranking of Website.

Another search engine example will further illustrate the problem of the types of responses delivered from the search query. This example relates to a user who desires to find a specific type of information on a technical computer question or error message. On the WWW, many websites have developed to provide information technology (IT) solutions to specific error messages. These websites house a growing database of content generated by users submitting questions and a technical community providing answers. In this manner, threads of information develop on specific IT problems. The websites then may present a large number of these threads, where each thread includes a particular question or technical issue and the various responses and attempted solutions to the problem. Therefore, when others receive the same error message, they can find the solution to the problem.

For example, a user may have the Microsoft® Word application crash with the error message "Winword.exe requested the runtime termination in an unusual way". The user may submit keywords from this error message into the Google search engine and get a response with a number of webpages that contain multiple threads dealing with various Microsoft Word problems. The user is then left to search multiple threads of information to find the particular thread that relates to the particular error message. In some cases, there may be hundreds of threads with no mechanism to find the specific answer. Furthermore, access to the threads may be obtained only via a password and subscription to the website. The user can get to the certain website wherein the answer to the query is found but then be faced with multiple interactive threads in which one of the threads holds the answer to the question. But the user cannot identify which is the appropriate thread within the website that contains the answer to the question.

This illustrates a basic problem with search engines in that they do not provide specific answers to user's questions and are based on non-natural language keyword searching. In this regard the standard search engines in some cases are not useful because they only identify Websites containing many links to other webpages and may not provide controlled access to a deeper layer of information which may hold a specific answer to the user's question.

Accordingly, what is needed in the art is a system and method of enabling a user to query a data base such as the WWW and obtain a precise answer to a question.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

A system, method and tangible computer-readable media for providing a natural language interface to a database or the Internet are disclosed. The method provides a response from a database to a natural language query. The method comprises receiving a user query, extracting key data from the user query, submitting the extracted key data to a data base search engine to retrieve a top n pages from the data base, processing of the top n pages through a natural language dialog engine and providing a response based on processing the top n pages.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
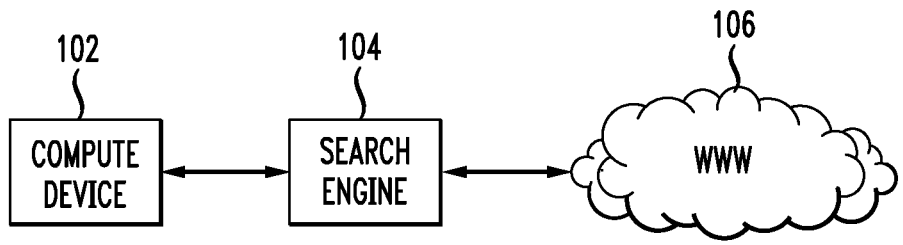
FIG. 1 illustrates the basic architecture for searching the Internet.
Figure 2:
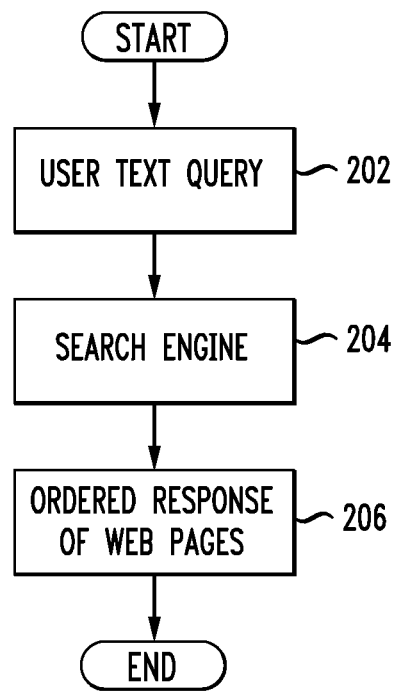
FIG. 2 illustrates the prior art method of entering a query to a search engine and receiving an ordered response of web pages.
Figure 3:
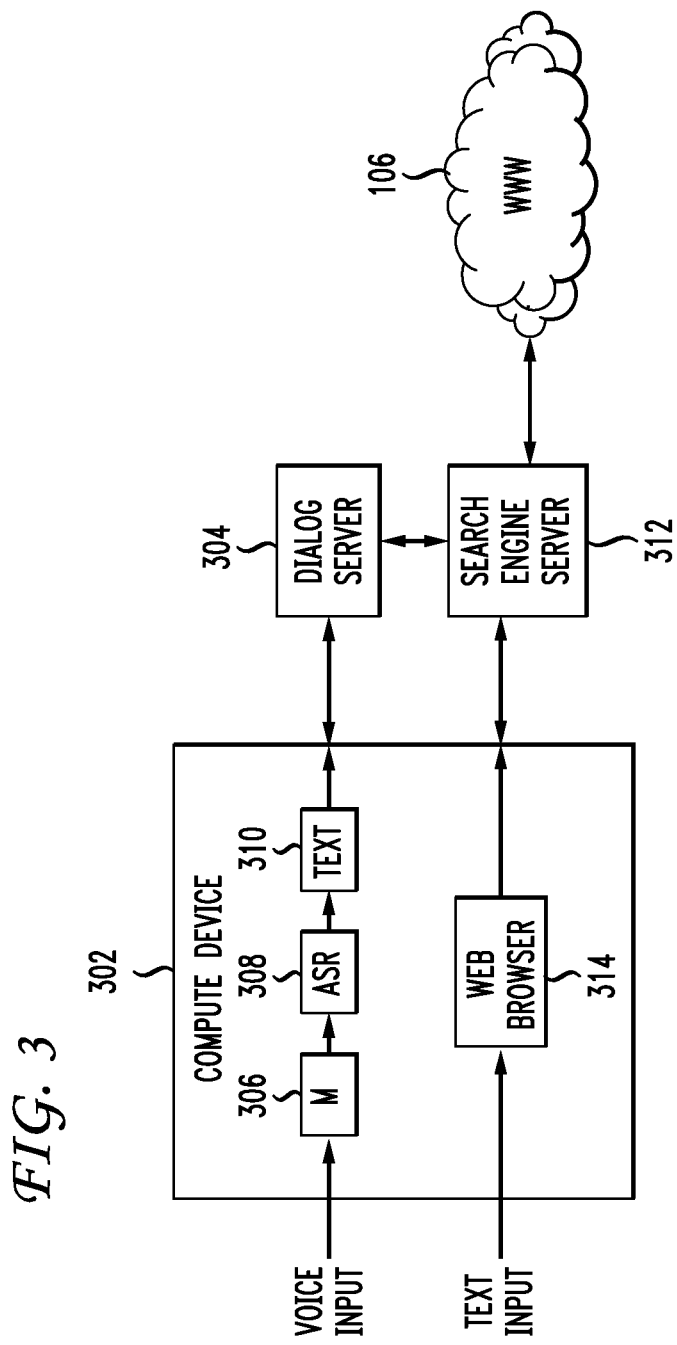
FIG. 3 illustrates the basic architecture according to an embodiment of the present invention.

The present invention relates to systems, methods and computer-readable media for providing a natural language dialog to a database such as the WWW, a corporate database, a private database or any other database. As can be appreciated, the primary benefit of the invention will be to search the WWW but there is no restriction unless specifically claimed to that as the searched database. FIG. 3 illustrates an exemplary architecture for the invention. The computing devices and servers shown may include such known hardware components as a central processor, a bus connecting various hardware components, memory, storage means such as a hard disk, random access memory, means for communicating and networking with other computers, and so forth. These components, improvements and variations thereof based on different devices are known to those of skill in the art.

As shown in FIG. 3, a computing device 302 enables a user to interact with the device 302 as well as other databases such as the WWW 104. The computing device 302 may be, for example, a desktop or laptop computer or a handheld wireless device. There is no restriction on the particular configuration of the computing device hardware or the particular means with which it communicates with other computing devices for searching the WWW or any other database. The compute device runs software that provides a user interface for interacting with the device. In one example, the client software is a browser 314 such as Internet Explorer® or Mozilla® wherein a user can direct the browser to a search engine website such as Google. The search engine server 312 serves the webpage to the user on the compute device and when the user inputs a text search, the server 312 uses an algorithm to search billions of webpages from the database 104 and presents an ordered list to the user's browser 314.

The invention provides for a natural language dialog approach to searching a database. In one aspect of the invention, the computing device includes a microphone 306 for receiving voice input from the user. An automatic speech recognition (ASR) engine or module 308 converts the speech into text 310. While the ASR engine is shown as part of the computing device 302, there is no restriction on where any particular hardware or software component resides. For example, the microphone may be separate from the computing device 302 and the ASR module may run on the dialog server 304 instead of the compute device 302. Those of skill in the art will understand the variations that are possible and contemplated while maintaining the core principles of the invention. It is preferably that a large vocabulary speech recognizer be used as the front-end to the user's request.

Figure 4:
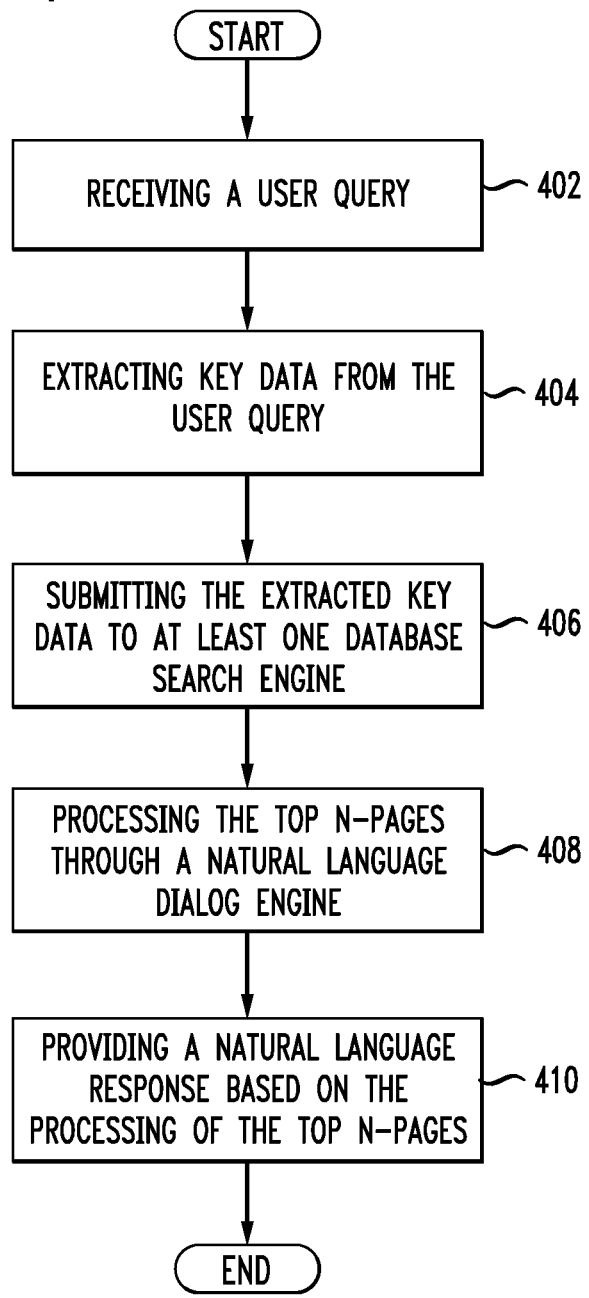
FIG. 4 illustrates a method embodiment of the invention.

The text is transmitted to a dialog server 304 that extracts key data from the user query. Various modules may be programmed to perform the steps set forth herein for practicing the invention. Those of skill in the art will understand the programming language and means for creating these various modules. Reference is also made to FIG. 4 as the steps of the method embodiment of the invention are discussed. A benefit from this invention is that the user can provide a natural language speech query that he or she would not otherwise input into a search engine such as Google. The user may say, for example, "what was the top speed of hurricane Ivan?". The system receives the user query (402). The extracted key data (404) is preferably key phrases and keywords from the natural language query. This key data may be extracted from various algorithms known to those of skill in the art, such as a variation of Information Retrieval-based methods with TFIDF (Term-frequency Inverse document frequency measure). Examples of the key data in this query could be "top speed" and "hurricane Ivan".

Once the key data is extracted from the user query, the data (words and/or phrases) are used as input to at least one search engine such as Google (406). In one aspect of the invention, the data is submitted to a plurality of search engines simultaneously or in a particular order or a random order. The results from the search engine search (or search from multiple search engines) identify a top n pages.

The top n pages may be organized or pre-processed by the server 304 to prepare the n pages for processing through a natural language dialog engine (408). One example of such preprocessing would be to automatically manage entry of a user's login name and password to entry fields associated with a website (such as the IT help website discussed above) which enable the system to process the pages viewable by registration only or where any kind of security, restrictions or access steps need to be taken for viewing. This may be an entry based on a previous manual registration by the user or may be an automatic negotiation between the server 304 and the particular website unknown to the end user or as part of a subscription plan in which the user may be automatically charged a certain fee to obtain the one-time access to the data in the website. Websites with restricted or registration-only access may need to be modified to enable negotiation based on a pre-registration or dynamically at the time of the search and response. In other words, some of the top n pages may require some password or other steps necessary to view and gain access to that data for processing and preparing the response.

A dialog engine as used in the invention may be based on, for example, question and answer technology and is able to process the pages and provide a natural language response to the question asked. Those of skill in the art are aware of such engines in that they are available from such companies as IBM and AT&T Corp. The natural language response may be based, for example, on particular text found within the top n pages. Taking the IT support example above where the user is presented with hundreds of threads of conversations, a benefit of processing the webpages and links from those webpages as well is that a natural language result can be presented to the user without the need for the user to cull through so many threads to find their answer.

From the dialog engine processing, a natural language response is generated (410). At this point, there are a number of technologies for presenting that response to the user. For example, the response may be generated as text in which case a text-to-speech module running on any computing device within the architecture can "speak" the answer to the user. Or, the user may be presented with the text of the answer in a browser with further organized options to click on the underlying pages where the information was retrieved or to view other websites and so forth.

In the hurricane example, the user may be presented with the answer either as text or audibly: "The top speed of Hurricane Ivan was 155 miles per hour, more information may be found at this link."

The invention may operate in both a text-based mode and a speech-based mode. It is further contemplated that a multimedia presentation may be used to enhance the interaction. For example, a virtual agent may be the interactive means by which the user speaks to provide the query and from which the response received. In this regard, an aspect of the invention is that it can operate in a dialog mode or an instant messaging mode where the user can chat with a virtual agent to get information or to provide subsequent relates questions on the same topic. The invention improves the user's ability to receive a specific response to a natural language query that is not possible from the known search engine approach that presents a plurality of webpages that may or may not contain the answer to the user's query.

In another aspect of the invention, a machine learning algorithm continues to find related documents from the database related to the input query and can expand the search accordingly. For example, after the system response is provided, the machine learning process can continue to find related information and can then present the user with an option to review the related information separate from the first provided response. The option to search through these additional documents may be presented to the user via a graphical user interface such as the browser or through a virtual agent.

Embodiments within the scope of the present invention may also include non-transitory computer-readable media for carrying or having computer-executable instructions or data structures stored thereon. Such computer-readable media can be any available media that can be accessed by a general purpose or special purpose computer. Computer-readable media comprise RAM, ROM, EEPROM, CD-ROM or other optical disk storage, magnetic disk storage or other magnetic storage devices, or any other non-transitory medium which can be used to carry or store desired program code means in the form of computer-executable instructions or data structures. When information is transferred or provided over a network or another non-transitory communications connection to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
   extracting, via a processor, key data from a user query;
     submitting the key data to a search engine to perform a search and to retrieve a set of top n pages from a database, wherein in response to a restriction to access a restricted page of the set of top n pages, the processor without user interference negotiates a fee to overcome the restriction independent of a user navigation to the restricted page;
   providing, at a first time, a response to the user query;
   after providing the response at the first time, continuing, without further user input, to search for information associated with the user query using a machine learning process to expand the search; and
   presenting an option to a device associated with a user, at a second time which is later than the first time, to view the related information separate from the response.

2. The method of claim 1, wherein the response is text-based and audible.

3. The method of claim 1, wherein the user query is one of a natural language speech query and a text-based query.

4. The method of claim 1, wherein the key data comprises one of keywords and key phrases.

5. The method of claim 1, wherein submitting of the key data to the search engine further comprises submitting the key data to a plurality of search engines.

6. The method of claim 1, wherein the user query is received via a speech recognizer.

7. The method of claim 1, wherein the response is a natural language response provided via synthetic speech.

8. The method of claim 1, wherein the response is a multimedia response.

9. The method of claim 1, wherein the user query and the response are provided and received via a dialog mode.

10. The method of claim 1, wherein the user interacts with a virtual agent in a dialog mode.

11. A system comprising:
   a processor; and a computer-readable storage medium having instructions stored which, when executed by the processor, result in the processor performing operations comprising:

extracting, via a processor, key data from a user query;

submitting the key data to a search engine to perform a search and to retrieve a set of top n pages from a database, wherein in response to a restriction to access a restricted page of the set of top n pages, the processor without user interference negotiates a fee to overcome the restriction independent of a user navigation to the restricted page;

providing, at a first time, a response to the user query;

after providing the response at the first time, continuing, without further user input, to search for information associated with the user query using a machine learning process to expand the search; and presenting an option to a device associated with a user, at a second time which is later than the first time, to view the related information separate from the response.

12. The system of claim 11, wherein the response is text-based and audible.

13. The system of claim 11, wherein the user query is one of a natural language speech query and a text-based query.

14. The system of claim 11, wherein the key data comprises one of keywords and key phrases.

15. The system of claim 11, wherein submitting of the key data to the search engine further comprises submitting the key data to a plurality of search engines.

16. The system of claim 11, wherein the user query is received via a speech recognizer.

17. The system of claim 11, wherein the response is a natural language response provided via synthetic speech.

18. The system of claim 11, wherein the response is a multimedia response.

19. A computer-readable hardware device having instructions stored which, when executed by a computing device, result in the computing device performing operations comprising:

extracting, via a processor, key data from a user query;

submitting the key data to a search engine to perform a search and to retrieve a set of top n pages from a database, wherein in response to a restriction to access a restricted page of the set of top n pages, the processor without user interference negotiates a fee to overcome the restriction independent of a user navigation to the restricted page;

providing, at a first time, a response to the user query;

after providing the response at the first time, continuing, without further user input, to search for information associated with the user query using a machine learning process to expand the search; and presenting an option to a device associated with a user, at a second time which is later than the first time, to view the related information separate from the response.

20. The computer-readable hardware device of claim 19, wherein the response is text-based and audible.

* * * * *